US008966232B2

(12) United States Patent
Tran

(10) Patent No.: US 8,966,232 B2
(45) Date of Patent: Feb. 24, 2015

(54) DATA PROCESSING SYSTEM OPERABLE IN SINGLE AND MULTI-THREAD MODES AND HAVING MULTIPLE CACHES AND METHOD OF OPERATION

(75) Inventor: Thang M. Tran, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 523 days.

(21) Appl. No.: 13/370,420

(22) Filed: Feb. 10, 2012

(65) Prior Publication Data
US 2013/0212585 A1 Aug. 15, 2013

(51) Int. Cl.
G06F 9/30 (2006.01)
G06F 9/38 (2006.01)

(52) U.S. Cl.
CPC ........ G06F 9/30043 (2013.01); G06F 9/30123 (2013.01)
USPC ....................................................... 712/229

(58) Field of Classification Search
CPC combination set(s) only.
See application file for complete search history.

(56) References Cited

U.S. PATENT DOCUMENTS

| 5,931,957 | A  | * | 8/1999  | Konigsburg et al. | 714/48  |
|-----------|----|---|---------|-------------------|---------|
| 6,003,102 | A  | * | 12/1999 | Aybay et al.      | 710/113 |
| 6,006,320 | A  | * | 12/1999 | Parady            | 712/36  |
| 6,070,238 | A  | * | 5/2000  | Feiste et al.     | 712/217 |
| 7,316,021 | B2 | * | 1/2008  | Joy et al.        | 718/108 |
| 2003/0005266 | A1 | * | 1/2003 | Akkary et al.    | 712/220 |
| 2004/0215932 | A1 |   | 10/2004 | Burky et al.     |         |
| 2004/0216101 | A1 |   | 10/2004 | Burky et al.     |         |
| 2007/0204137 | A1 |   | 8/2007  | Tran             |         |
| 2010/0146209 | A1 | * | 6/2010  | Burger et al.    | 711/120 |

OTHER PUBLICATIONS

U.S. Appl. No. 13/037,013, filed Feb. 28, 2011.
U.S. Appl. No. 13/036,321, filed Feb. 28, 2011.
U.S. Appl. No. 13/213,387, filed Aug. 19, 2011.

* cited by examiner

Primary Examiner — Eric Coleman

(57) ABSTRACT

In some embodiments, a data processing system includes a processing unit, a first load/store unit LSU and a second LSU configured to operate independently of the first LSU in single and multi-thread modes. A first store buffer is coupled to the first and second LSUs, and a second store buffer is coupled to the first and second LSUs. The first store buffer is used to execute a first thread in multi-thread mode. The second store buffer is used to execute a second thread in multi-thread mode. The first and second store buffers are used when executing a single thread in single thread mode.

20 Claims, 6 Drawing Sheets

DATA PROCESSING SYSTEM OPERABLE IN SINGLE AND MULTI-THREAD MODES AND HAVING MULTIPLE CACHES AND METHOD OF OPERATION

BACKGROUND

1. Field

This disclosure relates generally to data processing systems, and more specifically, to data processing systems operable in single and multi-thread modes and having multiple caches.

2. Related Art

Various processor designers have attempted to increase on-chip parallelism through superscalar techniques, which are directed to increasing instruction level parallelism (ILP), and multi-threading techniques, which are directed to exploiting thread level parallelism (TLP). A superscalar architecture attempts to simultaneously execute more than one instruction by fetching multiple instructions and simultaneously dispatching them to multiple (sometimes identical) functional units of the processor. A typical multi-threading operating system (OS) allows multiple processes and threads of the processes to utilize a processor one at a time, usually providing exclusive ownership of the processor to a particular thread for a time slice. In many cases, a process executing on a processor may stall for a number of cycles while waiting for some external resource (for example, a load from a random access memory (RAM)), thus lowering efficiency of the processor. Simultaneous multi-threading (SMT) allows multiple threads to execute different instructions from different processes in the same processor, using functional units that another executing thread or threads left unused.

In order to improve memory performance of processing systems, complex memory structures which seek to exploit the individual advantages of different types of memory have been developed. In particular, it has become common to use fast cache memory in association with larger, slower and cheaper main memory. For example, the memory in a computer system can be organized in a memory hierarchy comprising memory of typically different size and speed. Thus a computer system may typically comprise a large, low cost but slow main memory and in addition have one or more cache memory levels comprising relatively small and expensive but fast memory. During operation data from the main memory is dynamically copied into the cache memory to allow fast read cycles. Similarly, data may be written to the cache memory rather than the main memory thereby allowing for fast write cycles.

A memory operation where the processor can receive the data from the cache memory is typically referred to as a cache hit and a memory operation where the processor cannot receive the data from the cache memory is typically referred to as a cache miss. Typically, a cache miss does not only result in the processor retrieving data from the main memory but also results in a number of data transfers between the main memory and the cache. For example, if a given address is accessed resulting in a cache miss, the subsequent memory locations may be transferred to the cache memory. As processors frequently access consecutive memory locations, the probability of the cache memory comprising the desired data thereby typically increases.

BRIEF DESCRIPTION OF THE DRAWINGS

Embodiments of the present disclosure are illustrated by way of example and are not limited by the accompanying figures, in which like references indicate similar elements. Elements in the figures are illustrated for simplicity and clarity and have not necessarily been drawn to scale.

DETAILED DESCRIPTION

Embodiments of systems and methods disclosed herein are capable of operating in single and multi-threaded modes. In multi-thread mode, multiple independent load/store execution units and multiple independent data caches are used to help enable the threads to be executed at least as fast as they would execute on separate processors. Each independent load/store execution unit is used to execute load and store instructions of a corresponding thread and is coupled to provide load and store accesses of that corresponding thread to a corresponding one of the independent data caches. Furthermore, in multi-thread mode, each independent data cache has its own corresponding tag array. In single thread mode, each of the multiple independent data caches continue to operate independently. However, load and store accesses of the executing single thread are steered to the appropriate load/store execution unit and corresponding data cache. Therefore, in single thread mode, all of the multiple independent data caches may be utilized. In single thread mode, each tag array is configured such that it stores tag entries corresponding to multiple independent data caches. In this manner, each data cache continues to operate independently; however, each tag array maintains tags for more than one (or all) of the data caches. In one embodiment in which the processor includes two independent caches, when in single thread mode, the tag array of each independent cache is reconfigured to store only half of the number of entries as compared with its configuration during multi-thread mode, and each cache line is about twice the size of the cache line when configured in multi-thread mode. This cache reconfiguration may allow for improved single thread performance as compared to systems in which only the independent data cache corresponding to the load/store execution unit of the executing single thread is utilized.

Figure 1:
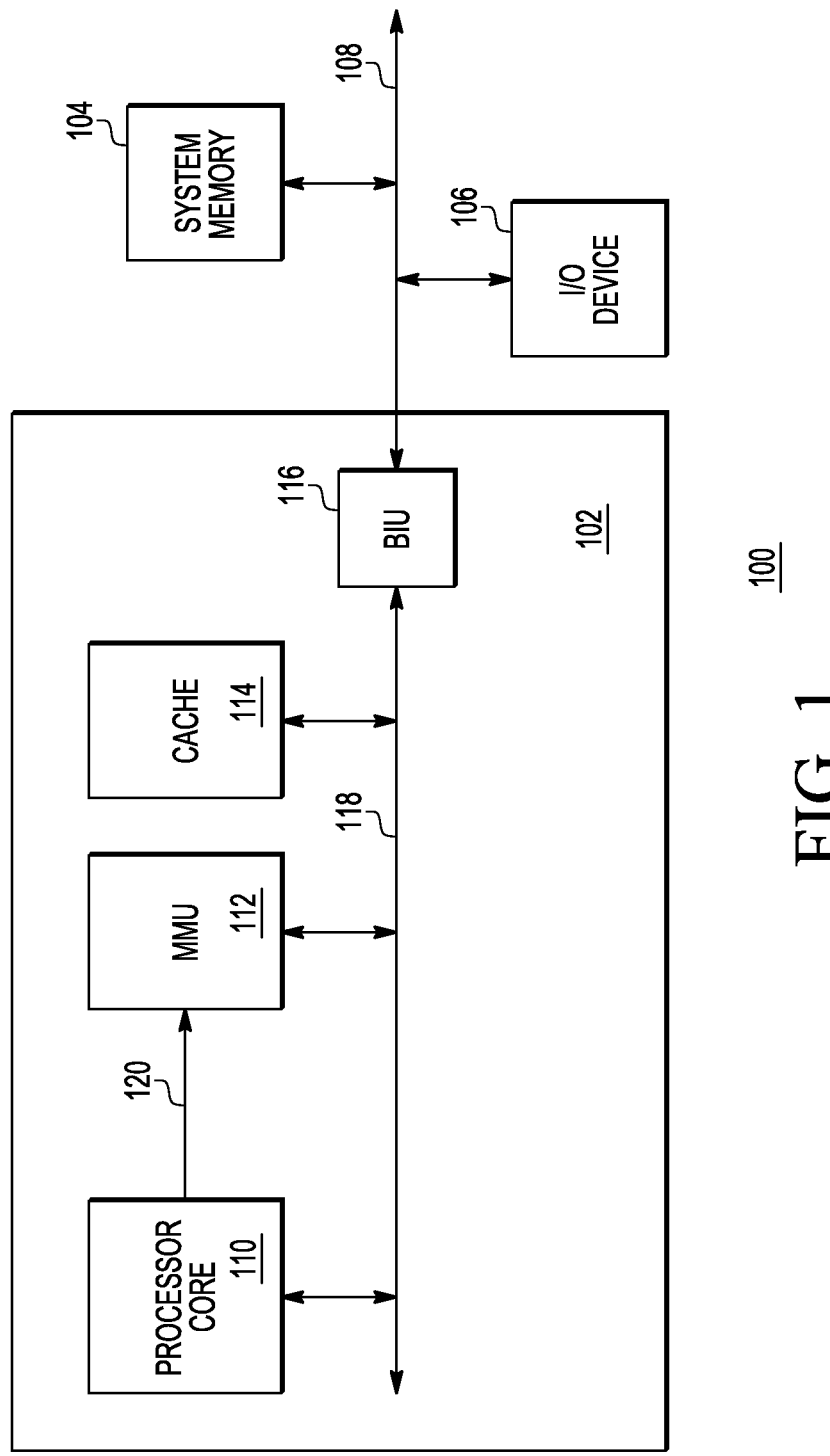
FIG. 1 illustrates, in block diagram form, a data processing system in accordance with one embodiment of the present disclosure.

FIG. 1 illustrates a data processing system 100 that can be configured to utilize multiple independent data caches during single thread mode. In the depicted example, data processing system 100 includes processing device 102 (which may also be referred to as a processor or microprocessing system), system memory device 104 (e.g., random access memory (RAM)), and one or more input/output devices 106 connected via bus 108. Bus 108 may be implemented as any type of system interconnect, such as, for example, a fabric switch. Processing device 102 includes processor core 110, memory management unit (MMU) 112, cache memory 114, and bus interface unit (BIU) 116 interconnected via bus 118, whereby BIU 116 serves as an interface between bus 118 and bus 108.

In operation, processing device 102 executes instructions using processor core 110, whereby instruction data and operand data can be accessed from cache 114, system memory device 104, I/O device 106, or another source. Data resulting from the execution of the instructions can be provided for storage in system memory device 104 or provided to I/O device 106 via BIU 116. In order to expedite memory accesses to devices external to processing device 102 (e.g., system memory device 104 and I/O device 106), cache 114 can be used to cache instruction data and related data. Cache 114 may include any number and type of caches. For example, cache 114 may include level 1 (L1) data caches which are accessed first and may also include higher level data caches (such as level 2 (L2) caches). Additionally, cache 114 may include one or more instruction caches in addition to data caches.

MMU 112 controls accesses to cache 114 and memory accesses to devices external to processing device 102, including system memory device 104 and I/O device 106. MMU 112 can map the system memory device 104 and the bus interface of the I/O device 106 to corresponding memory addresses (e.g., virtual memory addresses) so that all accesses to the external devices are treated as a memory access. MMU 112 may include translation look aside buffers (TLBs) which translates between virtual addresses received by MMU 112 to physical addresses which are provided to cache 114 or BIU 116 for the memory access.

Figure 2:
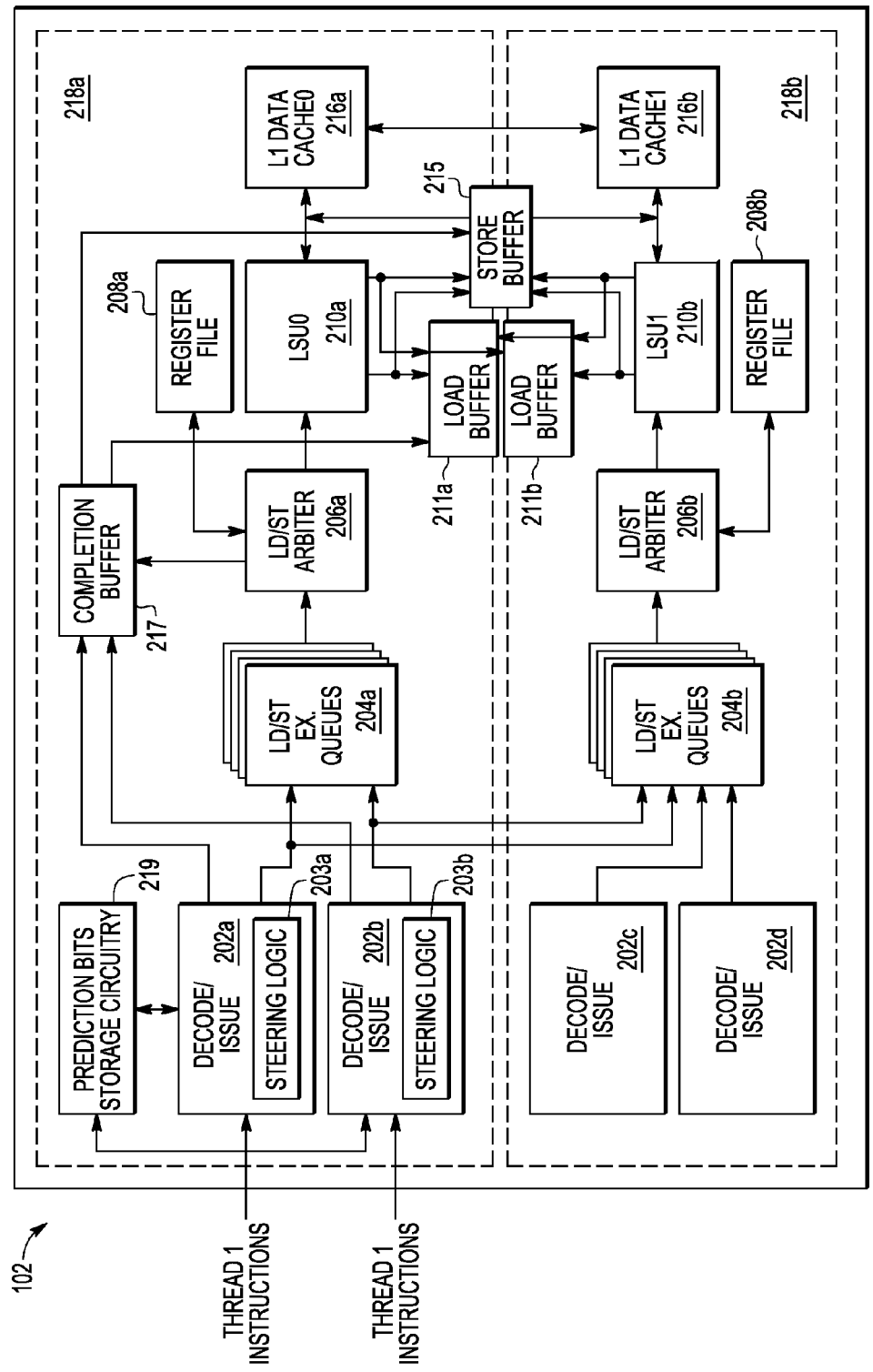
FIG. 2 illustrates, in block diagram form, a portion of a data processor of FIG. 1 in accordance with one embodiment of the present disclosure.

FIG. 2 is a diagram of an embodiment of components that can be used in processor 102 of FIG. 1. In FIG. 2, processor 102 is configured to run in single thread mode and includes decode/issue units 202a, 202b, 202c, 202d, load/store execution (ld/st ex) queues 204a, 204b, load/store (ld/st) arbiters 206a, 206b, register files 208a, 208b, load/store execution units (LSU0 and LSU1) 210a, 210b, level 1 data cache units (L1 data cache 0 and L1 data cache 1) 216a, 216b, a completion buffer 217, load buffers 211a, 211b, and a store buffer 215. Decode/issue unit 202a includes steering logic 203a and decode/issue unit 202b includes steering logic 203b. Elements referred to herein with a particular reference number followed by a letter are collectively referred to by the reference number alone. For example, decode units 202a-202d are collectively referred to as decode units 202. Note that ld/st execution units 210a and 210b may be referred to as LSU0 and LSU1, respectively, and load buffer units 211a and 211b may be referred to as load buffer 0 and load buffer 1, respectively. Also, data caches 216a and 216b may be referred to as L1 data cache 0 and L1 data cache 1, respectively.

Processor 102 includes two execution pipelines 218a, 218b. Pipeline 218a includes decode/issue units 202a, 202b, prediction bits storage circuitry 219, ld/st ex queues 204a, ld/st arbiter 206a, register file 208a, LSU0 210a, L1 data cache 0 216a, completion buffer 217, and load buffer 0 211a. Pipeline 218b includes decode/issue units 202c, 202d, ld/st ex queues 204b, ld/st arbiter 206b, register file 208b, LSU1 210b, L1 data cache 1 216b, and load buffer 1 211b. Store buffer 215 is shared by pipelines 218. Processor 102 is capable of operating in single thread or multi-thread mode.

In multi-thread mode, each ld/st ex unit and corresponding L1 data cache operate independently from the other ld/st ex unit and L1 data cache. For example, in dual thread mode, a first thread may utilize decode/issue units 202a and 202b, ld/st execution queues 204a, ld/st arbiter 206a, register file 208a, LSU0 210a, and L1 data cache 0 216a, and a second thread may utilize decode/issue units 202c and 202d, ld/st execution queues 204b, ld/st arbiter 206b, register file 208b, LSU1 210b, and L1 data cache 1 216b. Therefore, in dual thread mode, decode/issue units 202a and 202b provide instructions to ld/st ex queues 204a, and ld/st arbiter 206a selects ld/st instructions from queues 204a to provide to LSU0 210a, accessing register file 208a as needed. LSU0 210a provides ld/st accesses to L1 data cache0 216a. Decode/issue units 202c and 202d provide instructions to ld/st ex queues 204b, and ld/st arbiter 206b selects ld/st instructions from queue 204b to provide to LSU1 210b, accessing register file 208b as needed. LSU1 210b provides ld/st accesses to L1 data cache0 218b. Therefore, in one example, pipeline 218a may be used for executing a first set of one or more threads and pipeline 218b may be used for executing a second set of one or more threads. In some embodiments, components can be divided equally between the first and second threads. Other components (not shown) such as a floating point unit, an integer complex execution unit, and/or one or more integer execution units, for example, can be shared between the two pipelines 218. Also, system 102 can be configured to execute more than two threads, such as in quad thread mode, in which four threads may be executed.

In single thread configuration, decode/issue units 202a and 202b provide ld/st instructions to ld/st ex queues 204a and 204b. Ld/st arbiter 206a selects ld/st instructions from queues 204a to provide to LSU0 210a, accessing register file 208a as needed. LSU0 210a provides ld/st accesses to L1 data cache0 216a. Ld/st arbiter 206b selects ld/st instruction from queues 204b to provide to LSU1 210b, accessing register file 208b as needed. LSU1 210b provides ld/st accesses to L1 data cache1 216b. An instruction unit (not shown) implements instruction queues that may provide one program instruction concurrently to each of respective decode units 202a and 202b during each processor cycle. Steering logic 203 within decode/issue units 202a and 202b determines whether to provide the instruction to ld/st ex queues 204a or ld/st ex queues 204b. In this manner, by selecting one of queues 204a or 204b to which to direct a ld/st instruction, steering logic 203 determines which independent cache, L1 data cache 0 or L1 data cache 1, will receive the request address for the ld/st instruction. Furthermore, in some embodiments, steering logic 203 utilizes prediction information stored in prediction bits storage circuitry 219 to appropriately direct the instructions.

Therefore, in single thread mode, decode units 202a and 202b issue instructions to load/store execution queues 204a and 204b. However, in multi-thread mode, decode units 202a, 202b are restricted to issue instructions to load/store execution queue 204a and decode units 202c, 202d are restricted to load/store execution queue 204b.

Decode units 202 may include logic or logic instructions to multiplex valid instructions, decode instructions for instruction type, source, and destination operands, generate queue entries and tags for instructions, determine source and destination register dependencies between decoded instructions, check dependency with previous instructions in execution queues 204, and separate complex instructions into microinstructions. Decode units 202 can also handle issuing serialized instructions such as instruction exceptions (e.g., Translation Look-aside Buffer miss, breakpoint, and illegal instruction), software interrupts (SWI), and instructions that modify processor configuration and states. Decode units 202 can also update renaming in register files 208 for issued instructions. Queues 204 may be designed to have optimal size for normal execution.

Microprocessors that require instructions to be executed in-order experience long delays when data required to execute the instruction is not found in cache memory, i.e., a cache miss occurs. Microprocessors that allow out-of-order execution include a replay queue for instructions that experience a data cache miss and constantly check for availability of source operands in order to execute instructions. Further, instructions that depend on one another may fill the execution queue and block the execution of independent instructions. In contrast, processor 102 can further schedule execution of instructions using ld/st arbiter 206 to arbitrate execution of load/store instructions in ld/st ex queues 204 both in-order and out-of-order. Each execution pipeline 218a, 218b of processor 102 includes multiple ld/st ex queues 204 to hold the dependent instructions that experience a cache miss in the same queue until completion instead of replaying or re-issuing instructions while independent instructions are free to issue from other execution queues. Additionally, when an instruction issues, since the instructions in queues 204 can be in-order, data for source operands will be available from result forwarding of an immediate prior instruction in the same queue or from register file 208a. In many cases, it is possible to statistically determine when data for the source operands of an instruction will be available and schedule accordingly. However, in some cases, such as L1 data cache misses, the data may not be available as expected. In cases where instructions are dependent on two load instructions, the dependent instructions can be sent to two different queues 204. The dependent instruction in one of queues 204 will then be invalidated when the copy of the instruction reaches the head of another of queues 204.

Ld/st arbiters 206 send instructions to load/store execution units 210. Load instructions from ld/st ex queues 204 dispatch to load/store execution units 210 and will remain in a respective queue 204 until data is returned in the next clock cycle, effectively blocking all dependent instructions until valid data is returned in the next clock cycle. Ld/st execution units 210 can send data ready signals to queues 204 when a cache hit is detected from L1 data cache 0 216a. The bottom entries of ld/st ex queues 204 can send an entry or tag that includes time stamp information to ld/st arbiter 206. The time stamp information allows ld/st arbiter 206 to determine and send the oldest instruction to ld/st execution units 210. Alternatively, load/store arbiter 206 can receive and send instructions on a round robin basis, where the first instruction that reaches arbiter 206 is the first instruction sent to load/store execution units 210. The round robin basis is matched by decode units 202 for issuing independent load/store instructions to load/store execution queue 204.

L1 data cache 0 216a returns a hit/miss indication to ld/st execution unit 210a, and L1 data cache 1 216b returns a hit/miss indication to ld/st execution unit 210b. In addition, if the particular memory operation is a load (thus having a corresponding load memory address from which load data is to be loaded from) and results in a cache hit, data cache 216a forwards the corresponding load data to ld/st execution unit 210a and data cache 216b forwards the corresponding load data to ld/st execution unit 210b. Also, when the memory operation is a load, once it is provided to LSU 210a or 210b and its corresponding load address is translated to a physical address, that load instruction with its corresponding load address gets stored in load buffer 211a or 211b, respectively. Similarly, when the memory operation is a store (thus having a corresponding store memory address to which store data will be stored), once the store instruction is provided to LSU 210a or 210b and its corresponding store address is translated to a physical address, the store instruction with its corresponding store address gets stored to store buffer 215. When operating in single thread mode, in response to a cache hit for a load instruction, L1 data cache 0 216a may return data to ld/st execution unit 210b, and, in response to cache hit for a load instruction, L1 data cache 1 216b may return data to ld/st execution unit 210a. Also, when operating in single thread mode, L1 data caches 216 are configured to bidirectionally communicate with each other in order to allow each cache to continue to operate independently. Operation of L1 data caches 216 in single thread mode will be described further below with respect to FIGS. 3-10.

Figure 3:
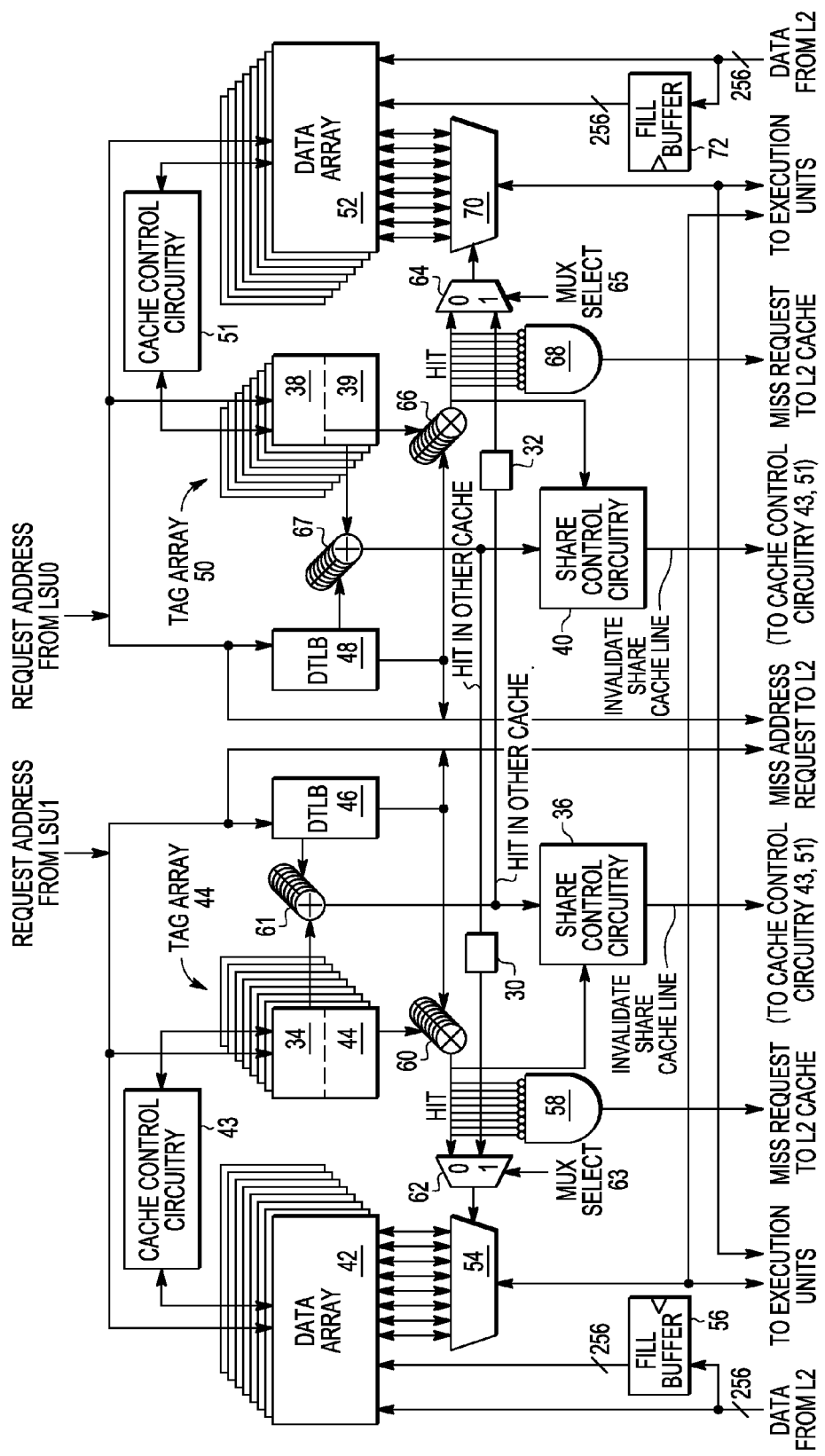
FIG. 3 illustrates, in block diagram form, the L1 data cache 0 and the L1 data cache 1 of FIG. 2 in accordance with one embodiment of the present disclosure.

FIG. 3 illustrates, in block diagram form, L1 data cache 0 216a and L1 data cache 1 216b in accordance with one embodiment of the present disclosure. L1 data cache 0 216a includes data array 52, TAG array 50, data TLB (DTLB) 48, cache control circuitry 51, share control circuitry 40, multiplexors (MUXes) 64 and 70, comparators 66 and 67, miss determination circuitry 68, latch 32, and fill buffer 72. L1 data cache 1 216b includes data array 42, TAG array 44, data TLB (DTLB) 46, cache control circuitry 43, share control circuitry 36, multiplexors (MUXes) 62 and 54, comparators 60 and 61, miss determination circuitry 58, latch 30, and fill buffer 56. TAG array 44 includes a first portion 34 and a second portion 35, and TAG array 50 includes a first portion 38 and a second portion 39. In single thread mode, portion 34 stores tags for data array 52, and portion 35 stores tags for data array 42. Also, in single thread mode, portion 38 stores tags for data array 52, and portion 39 stores tags for data array 42. Therefore, as will be described in more detail below, in multithread mode, TAG array 50 stores tags only for data array 52, and TAG array 44 stores tags only for data array 42. However, in single thread mode, TAG array 50 stores tags for both data array 52 and 42, and TAG array 44 stores tags for both data array 52 and 42. In this manner, in single thread mode, TAG arrays 44 and 50 store the same data.

A request address from LSU1 (corresponding to a load or store instruction and which may be referred to as a load address or store address, respectively) is provided to data array 42, TAG array 44, and DTLB 46. A request address from LSU0 (corresponding to a load or store instruction and which may be referred to as a load address or store address, respectively) is provided to data array 52, TAG array 50, and DTLB 48. The request address from LSU0 is provided to DTLB 48 such that the virtual request address provided by the ld/st execution units 210 can be translated to a physical address at the output of DTLB 48, and the request address from LSU1 is provided to DTLB 46 such that the virtual request address can be translated to a physical address at the output of DTLB 46. Therefore, since TAG arrays 44 and 50 of L1 data caches 216 correspond to physical addresses, comparators 60, 61, 66, and 67 can compare the tag addresses to the appropriate physical address from DTLBs 46 and 48, as will be described below. Note that DTLB 46 provides translated addresses for L1 data cache 1 216b and DTLB 48 provides translated addressees for L1 data cache 0 216a. In one embodiment, DTLBs 46 and 48 are not located within L1 data caches 216 and is located in MMU 112 which is coupled to L1 data caches 216.

In the illustrated embodiment, each L1 data cache 216 is implemented as an N-way set associative cache. Therefore, each of TAG arrays 44 and 50 provide N outputs, one for each way, corresponding to the TAG address for the selected set. (Note that a portion of the received request address can be used to indicate the selected set of the caches.) L1 data cache 216 can operate in either multi-thread or single thread mode.

In multi-thread mode, all entries in TAG array 50 correspond to data array 52, and all entries in TAG array 44 correspond to data array 42. In one example, L1 data cache 216 is an 8-way set associative cache, and each of TAG arrays 44 and 50 include 64 entries per way, resulting in a total of 512 tags. Each tag entry corresponds to a particular cache line size, such as, for example, 64 bytes (64B). In multi-thread mode, comparators 60 and 66 may receive N TAG address from TAG array 44 and 50, respectively, and compares each of the N TAG addresses (which may be qualified by a respective valid bit in each TAG entry) to the outputs of DTLB 46 and 48, respectively. In response to the comparisons, comparators 60 and 66 each generate N hit indicator signals, one for each way. If a hit signal is asserted, it indicates that the received address hit in the corresponding way of the corresponding cache, and if negated, indicates that the received address missed in the corresponding way of the corresponding cache. The hit indicators from comparator 60 is provided to MUX 54 which receives N data outputs from DATA array 42, one for each way. The hit signals from comparators 60 are provided to the control of MUX 54 by way of MUX 62 (in which MUX select 63 is negated so as to provide the hit signals from comparators 60) such that if any of the hit indicators from comparators 60 is asserted, the data from the cache line of the selected set of the appropriate way is provided as the output of MUX 54 to the execution units (e.g. ld/st execution units 210). Also, for a request address for a load instruction which results in a miss in L1 data cache 1 216b, data from the L2 cache (which may be located within cache 114), can be provided directly to data array 42 or may be provided by way of fill buffer 56 to data array 42. The hit indicators from comparators 60 are also provided to miss determination circuitry 58, which may be implemented as an AND gate with inverting inputs, such that if no hit signal is asserted, a miss request signal for L1 data cache 1 is asserted and provided to the L2 cache.

The hit indicators from comparators 66 are provided to MUX 70 which receives N data outputs from DATA array 52, one for each way. The hit signals from comparators 66 are provided to the control of MUX 70 by way of MUX 64 (in which MUX select 65 is negated so as to provide the hit signals from comparators 66) such that if any of the hit indicators from comparators 66 is asserted, the data from the cache line of the selected set of the appropriate way is provided as the output of MUX 70 to the execution units (e.g. ld/st execution units 210). Also, for a request address for a load instruction which results in a miss in L1 data cache 0 216a, data from the L2 cache (which may be located within cache 114), can be provided directly to data array 52 or may be provided by way of fill buffer 72 to data array 52. The hit indicators from comparators 66 are also provided to miss determination circuitry 68, which may be implemented as an AND gate with inverting inputs, such that if no hit signal is asserted, a miss request signal for L1 data cache 0 is asserted and provided to the L2 cache.

Therefore, note that in multi-thread mode, a hit in TAG array 50 indicates that corresponding cache data is located in data array 52, and a hit in TAG array 44 indicates that corresponding cache data is located in data array 42. However, in single thread mode, each TAG array is configured such that a first portion of the TAG array corresponds to one data array and a second portion of the same TAG array corresponds to another data array. In this configuration, each tag array would store the same information. For example, as illustrated in FIG. 3, portion 34 of TAG array 44 corresponds to cache data stored in data array 52 and portion 35 of TAG array 44 corresponds to cache data stored in data array 42. Similarly, portion 38 of TAG array 50 corresponds to cache data stored in data array 52 and portion 39 of TAG array 50 corresponds to cache data stored in data array 42. In the example provided above, in which L1 data cache 216 is an 8-way set associative cache, and each tag array is configured as described above with respect to multi-thread mode, each tag array can be reconfigured for single-thread mode such that each portion of a tag array includes only 32 entries rather than 64 entries. In this manner, 32 entries of each tag array correspond to data array 42 and another 32 entries of each tag array correspond to data array 52. Therefore, each TAG array still includes a total of 512 entries. In this example, since a fewer number of tag entries correspond to each data array, the cache line size corresponding to each tag entry may be larger as compared to multi-thread mode. For example, rather than 64B cache lines as used in multi-thread mode, each cache line may be 128B in single thread mode. In one embodiment, in multi-thread mode, 6 address bits are used to address the 64 entries of each data array. However, in single-thread mode, only 5 address bits are needed to address the 32 entries of each data array. Therefore, the bit which is not used in single-thread mode may be used to distinguish whether the particular tag entry corresponds to data array 42 or data array 52. For example, in one embodiment, bits 52-57 of the received address may be used to address the tag arrays in multi-thread mode, and only bits 52-56 of the received address may be used to address the tag arrays in single-thread mode. In single thread mode, bit 57 may be used to indicate the data array. For example, a value of 0 for bit 57 may indicate a tag entry for data array 52, and a value of 1 for bit 57 may indicate a tag entry for data array 42. In one example implementation, each TAG array may instead have 16 sets and 32 entries which are indexed by bits 52-56. In this example, in multi-thread mode, address bit 57 may be used to select 8 sets of the 16 sets for tag comparisons, and in single thread mode, all 16 tag comparators may be used in which 8 of the sets are disabled by using address bit 57. Note that the particular bit locations indicated herein and size values provided are only exemplary. Furthermore, note that the portions 34, 35, 38, and 39 are simply representative portions, and does not indicate that a top half of a tag entry corresponds to a data array and the bottom half to another. That is, the tag entries of both portions of a tag array may be interwoven.

In single thread mode, comparators 60 of L1 data cache 1 receive N tag address from portion 35 of TAG array 44 and compares each of the N TAG addresses (which may be qualified by a respective valid bit in each TAG entry) to the output of DTLB 46. In response to the comparisons, comparators 60 generate N hit indicator signals, one for each way. These hit signals are provided to MUX 54 by way of MUX 62 and to miss-determination circuitry 58, all of which operate as was described above with respect to multi-thread mode. Comparators 61 of L1 data cache 1 receive N tag address from portion 34 of TAG array 44 and compares each of the N TAG address (which may be qualified by a respective valid bit in each TAG entry) to the output of DTLB 46. In response to the comparisons, comparators 61 generate N hit indicator signals, one for each way. However, since in single thread mode portion 34 corresponds to data array 52, these hit signals are provided to a latch 32 and eventually provided to MUX 70 via MUX 64 (in which MUX select 65 is asserted to allow the hit signals from TAG array 44 to be provided to data array 52). These hit signals are also provided to miss-determination circuitry 68. Note that MUX 70 and miss-determination circuitry 68 operate as was described above with respect to multi-thread mode. However, the results are based on hit signals provided from L1 data cache 1 rather than hit signals generated from within L1 data cache 0. Note that latch 32 is used when the timing of hit signals from comparators 61 to MUX 70 is not possible.

In a similar manner, comparators 66 of L1 data cache 0 receive N tag address from portion 38 of TAG array 50 and compares each of the N TAG addresses (which may be qualified by a respective valid bit in each TAG entry) to the output of DTLB 48. In response to the comparisons, comparators 66 generate N hit indicator signals, one for each way. These hit signals are provided to MUX 70 by way of MUX 64 and to miss-determination circuitry 68, all of which operate as was described above with respect to multi-thread mode.

Comparators 67 of L1 data cache 0 receive N tag address from portion 39 of TAG array 50 and compares each of the N TAG address (which may be qualified by a respective valid bit in each TAG entry) to the output of DTLB 48. In response to the comparisons, comparators 67 generate N hit indicator signals, one for each way. However, since in single thread mode portion 39 corresponds to data array 42, these hit signals are provided to a latch 30 and eventually provided to MUX 54 via MUX 62 (in which MUX select 63 is asserted to allow the hit signals from TAG array 50 to be provided to data array 42). These hit signals are also provided to miss-determination circuitry 58. Note that MUX 54 and miss-determination circuitry 58 operate as was described above with respect to multi-thread mode. However, the results are based on hit signals provided from L1 data cache 0 rather than hit signals generated from within L1 data cache 1. Note that latch 30 is used when the timing of hit signals from comparators 67 to MUX 54 is not possible.

Also, as will be described in more detail below, the hit signals from comparators 61 are provided to share control circuitry 36 which may provide an invalidate share cache line signal to cache control circuitry 43 and 51. Similarly, the hit signals from comparators 67 are provided to share control circuit 40 which may provide an invalidate share cache line signal to cache control circuitry 43 and 51.

Note that, in single thread mode, rather than restricting L1 data cache use to L1 data cache 0 in which L1 data cache 1 remains unused, both L1 data cache 0 and L1 data cache 1 continue to be used, each operating independently (in which neither operates as a victim cache to the other.) Operation of L1 data caches 216 in single thread mode will be further described in reference to FIGS. 4-6 below.

Figure 4:
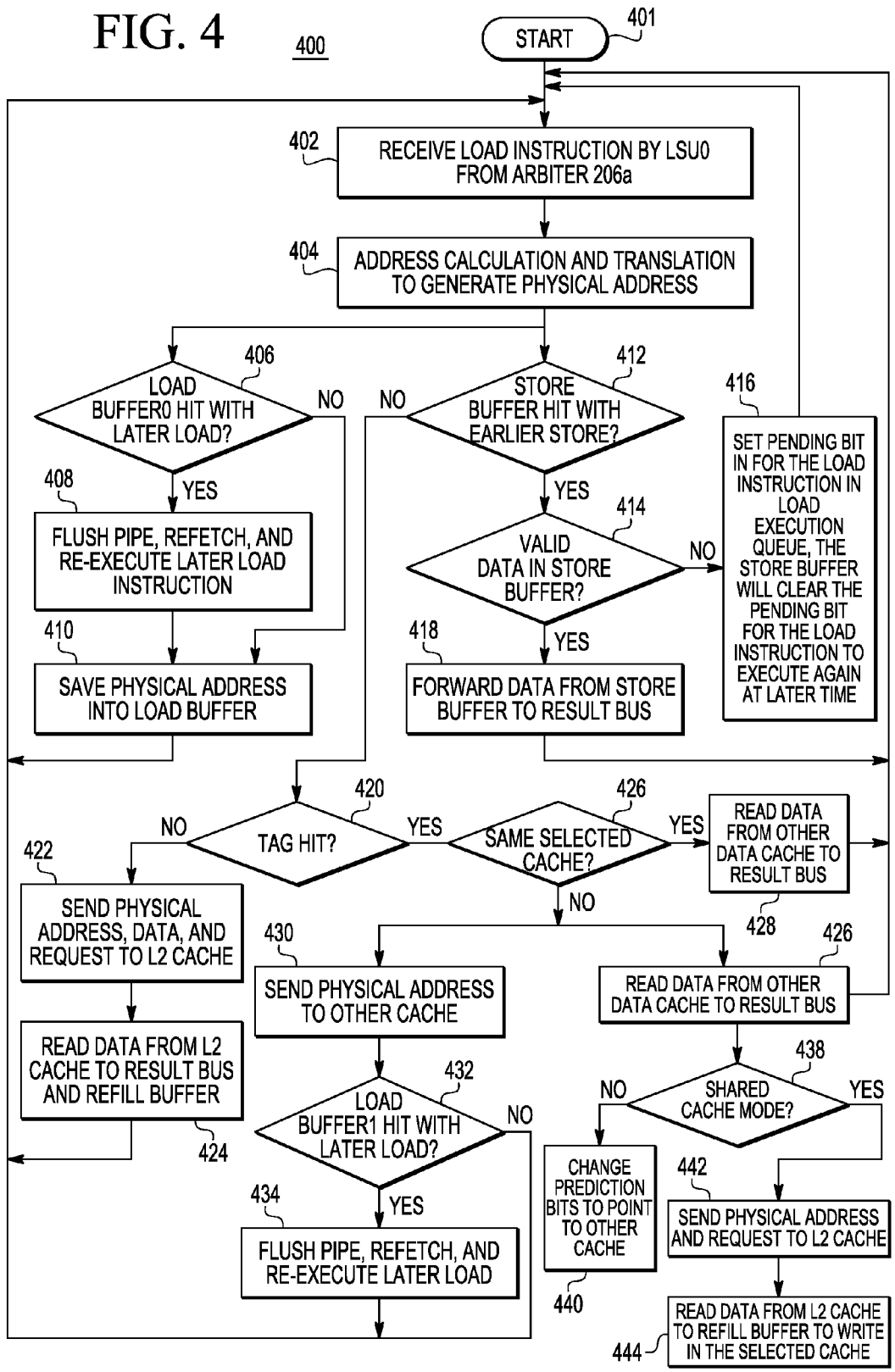
FIG. 4 illustrates, in flow diagram form, a method of processing a load instruction, in accordance with one embodiment of the present disclosure.
Figure 5:
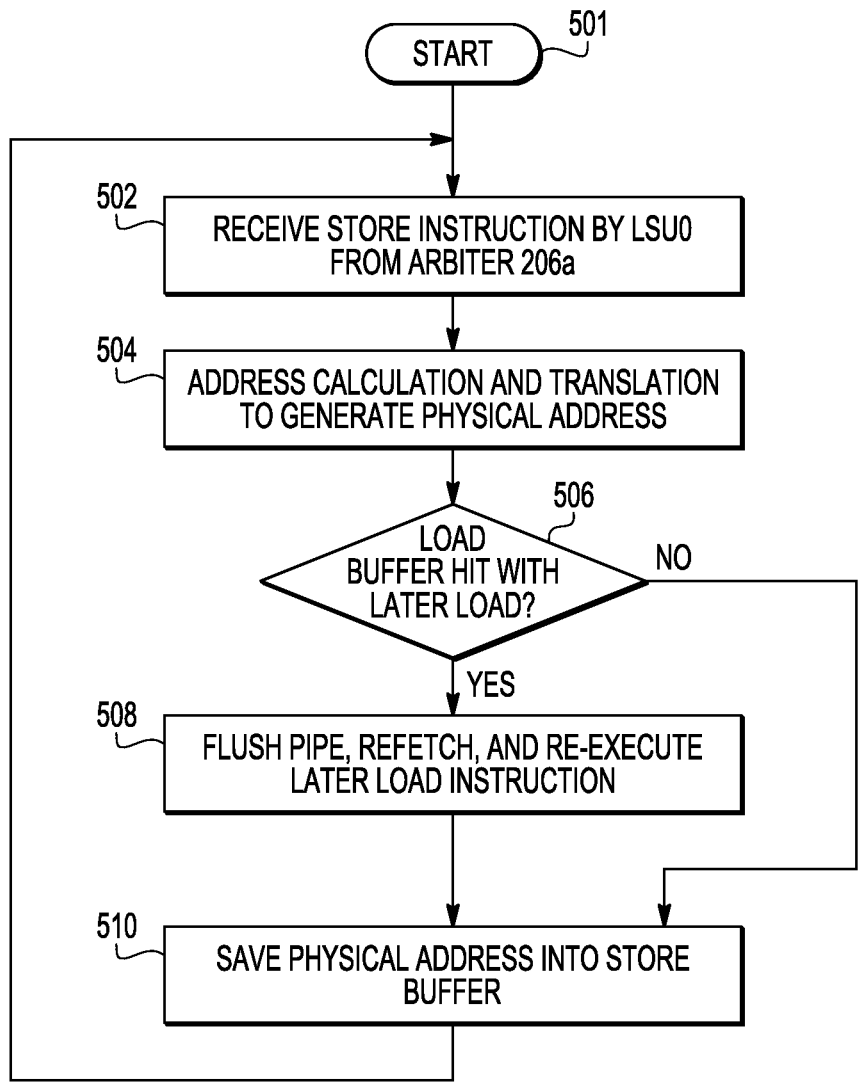
FIGS. 5 and 6 illustrate, in flow diagram form, a method of processing a store instruction, in accordance with one embodiment of the present disclosure.
Figure 6:
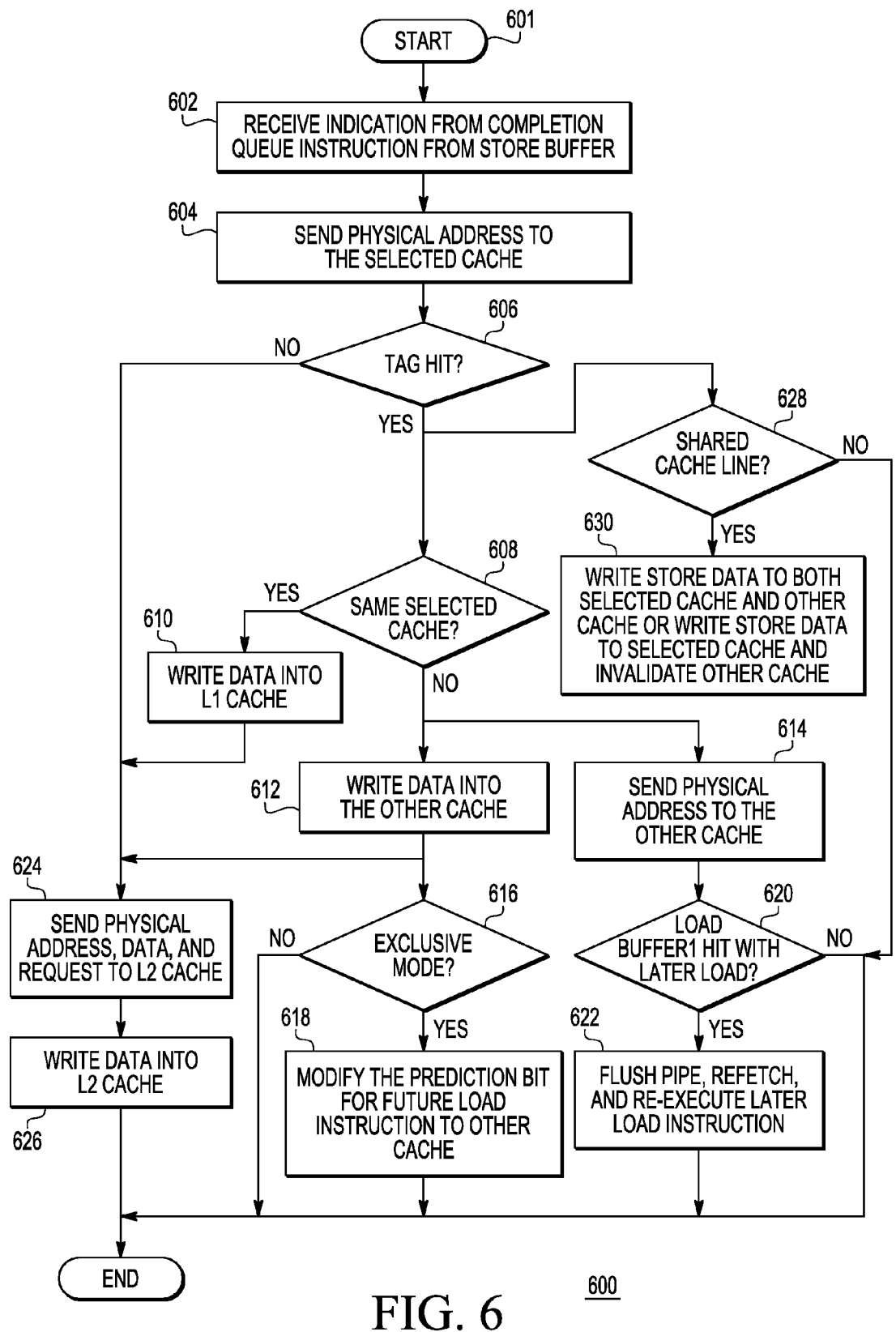

L1 data caches 216 are capable of operating either in write through mode or copy back mode. In write through mode, when an update is made to the cache, it is also written through to the other corresponding memory locations (such as in L2 and other higher level caches and main memory) such that memory is maintained coherent at the time an entry is updated in the L1 cache. In copy back mode, when updates are made to the cache, the updates are not immediately made to other memory locations to maintain coherency. Instead, status bits in accordance with a particular protocol (such as the MESI protocol, which is well known in the art) may be used and updated accordingly to indicate whether or not a cache line is coherent with memory. In the examples of FIGS. 4-6, it is assumed that the caches operate in write through mode.

Referring back to FIG. 2, and as will be described in more detail below, the outputs of DTLBs 46 and 48 are also provided to load buffers 211a and 211b, respectively, and to store buffer 215. Therefore, once a load or store instruction is provided by LSU0 or LSU1 to DTLB 46 or 48, the physical load or store address of the load or store instruction is stored in a load or store buffer. In the case of a load instruction, it is stored in load buffer 0 211a if received from LSU0 and in load buffer 1 211b if received from LSU1. Store buffer 215 collectively stores the store addresses from either LSU0 or LSU1. Therefore, load buffers 211 and store buffer 215 keep track of instructions that have been executed (i.e. selected by ld/st arbiter 206a for execution by either LSU0 or LSU1) and which physical address they modify or read from. Note that, in multi-thread mode, store buffer 215 may be used as including two portions (e.g. store buffer 0 and store buffer 1), in which the first portion is used to execute a first thread in multi-thread mode and the second portion are used to execute a second thread in multi-thread mode. However, in single thread mode, both portions of store buffer 215 may be used together when executing an instruction stream. In this manner, store buffer 215 keeps track of store instructions that have been sent to execution by either LSU0 or LSU1. Furthermore, when store data is received, the store data may also be stored in store buffer 215 along with the store instruction and the corresponding physical store address. Therefore, at any given point in time, there may or may not be valid store data stored in store buffer 215 for a particular physical store address.

Also, still referring to FIG. 2, as instructions are issued by decode/issue unit 202, they are also stored in completion buffer 217 which keeps track of the order of instructions as issued from decode/issue unit 202a and 202b. In this manner, completion buffer 217 maintains the chronological order of instructions within the thread's instruction stream. Also, each instruction in completion buffer 217 may have a corresponding completion bit which, when asserted, such as by ld/st arbiter 206a, indicates the instruction has been completed. Completion buffer 217 may communicate information with respect to instruction completion to load buffers 211 and store buffer 215.

FIGS. 4-6 describe executions of load and store instructions in single thread mode. In single thread mode, load and store instructions can be directed or steered to either ld/st execution queues 204a or 204b by steering logic 203. In this manner, steering logic 203 determines whether each particular load or store instruction is directed to LSU0 and L1 data cache 0 or to LSU1 and L1 data cache 1. In one embodiment, a fixed steering mechanism is used to determine how to direct the instruction. In one embodiment, a characteristic of the register number which holds the base address of the load or store instruction is used to direct the instruction. For example, in register files 208, each register has an associated register number. In one embodiment, each register file 208 includes 32 registers, R0-R31. Thus, each register has an associate number 0 to 31. Register files 208 are general purpose registers and are defined by the system architecture of each processor. Furthermore, during decode, the number of the register which holds the base address of the instruction (referred to as the base address register number) can be determined. Therefore, decode/issue units 202 can determine this information. In one fixed steering mechanism, the instruction is directed based on whether the register number of the base address is an odd or an even numbered register. In other fixed steering mechanisms, additional information may be used to direct the instructions. For example, a hashing of the register number of the base address together with the register number of the offset may be used, such that if the hashing result is even, it is directed to one data cache, and if odd, to the other data cache. Alternatively, a hashing of the register number of the base address together with offset in the offset register can be performed.

In another embodiment, consecutive load instructions with different base address registers may be directed to different caches. That is, consecutive load instructions may be alternately directed to different caches, in which subsequent accesses using the same base address number would also be sent to the same cache. For example, if a first encountered load instruction has a base address register of R3, then this load instruction can be directed to LSU0 and L1 data cache0. Furthermore, all future load/store instructions which use R3 as the base address register would also be directed to LSU0 and L1 data cache0. In this example, if a next consecutive load instruction has a base address register of R9, then this next consecutive load instruction can be directed to LSU1 and L1 data cache1. Furthermore, all future load/store instructions which use R9 as the base address register would also be directed to LSU1 and L1 data cache1. Similarly, for a next consecutive load instruction which uses a different base address than R3 or R9, it (as well as future instructions using the same base address as this instruction) would be directed to LSU0 and L1 data cache0. In this manner, consecutive load instruction with different base address registers are directed to different caches, and subsequent instructions which use the same base address as a previous load instruction which was previously directed to a particular cache is also directed to that same particular cache.

In yet another embodiment, groups of consecutive register numbers may be defined which cause an instruction to be directed to one cache or the other. For example, if the base address register is one of registers 0-15, the instruction may be directed to one cache and if it is one of registers 16-31, the instruction may be directed to the other cache. Note that the register groupings may be stored in user programmable storage circuitry. Also, note that other aspects of the load or store instruction, other than the register which holds the base address, may be used by steering logic 203 to appropriately direct the instructions.

In other embodiments, predictive steering mechanisms may be used to direct a particular load or store instruction to one cache or another. For example, a prediction bit or prediction indicator may be stored for each register in register file 208a and 208b to indicate whether, when the base address is provided in the corresponding register, the instruction is directed to cache 0 or cache 1. This may be initially set up to be a particular value (e.g. all odd registers can have its corresponding prediction bit asserted to indicate it goes to one cache and all even registers can have its corresponding prediction bit negated to indicate it goes to the other cache.) These prediction bits may then be modified, as needed, during operation to change their prediction. For example, when a miss occurs in the cache originally indicated by a prediction bit, but it hits in the other cache, the prediction bit can be changed to indicate the other cache. Furthermore, each prediction bit may have a corresponding qualifier bit which indicates whether to use the corresponding prediction bit or another steering mechanism (such as any of those fixed mechanisms described above) to direct the instruction. These prediction bits and qualifier bits, if present, can be collectively referred to as prediction bits (or prediction indicators) and stored in prediction bits storage circuitry 219. Note that any number of bits may be used to provide a prediction indicator for each register in register files 208.

In the examples of FIGS. 4-6, it is assumed that a predictive steering mechanism is used; however, alternate embodiments may use any fixed steering mechanism. Also, the examples of FIGS. 4-6 are provided from the perspective of selecting L1 data cache 0 216a as the selected cache and therefore having L1 data cache 1 216b as the other cache. However, analogous descriptions apply if L1 data cache 1 216b is considered the selected cache and L1 data cache 0 216a the other cache.

FIG. 4 illustrates, in flow diagram form, a method 400 of executing a load instruction in single thread mode, in accordance with one embodiment of the present disclosure. Method 400 begins with start 401 and proceeds to block 402 in which a load instruction with a corresponding load address from which data is to be loaded is received in by LSU0 210a from ld/st arbiter 206a. This load instruction may be referred to as the current load instruction, and the load address may be referred to as the request address. Note that this load instruction has also previously been stored in completion buffer 217. Method 400 continues to block 404 in which address calculation and translation is used to generate the physical address for the load address of the load instruction. That is, based on the load instruction, the load address may be calculated and this load address may subsequently be translated. For example, referring to FIG. 3, the load address from LSU0 (i.e. the request address) is provided to DTLB 48 for translation into a physical address.

Method 400 then proceeds to decision diamond 406 as well as to decision diamond 412. That is, the path of decision diamond 406 and decision diamond 412 may occur in parallel. At decision diamond 406, it is determined whether the current load instruction hits in load buffer 0 211a with a later load. That is, it is determined whether there is a hit (i.e. a match) with a physical load address for a load instruction that is later in chronologic order of the instruction stream than the current load instruction. If so, then it indicates that a load instruction later in the instruction stream for the same load address has already been sent for execution to LSU0. In this case, method 400 proceeds to block 408 in which the pipe is flushed, the later instruction which was in load buffer 0 is ref etched and re-executed. That is, the load data provided in response to the later load instruction may be inaccurate due to the current load instruction. After block 408, or, if it was determined that there was no load buffer 0 hit with a later load at decision diamond 406, method 400 proceeds to block 410 in which the physical load address of the current load instruction is saved into load buffer0. Method 400 returns to block 402 until another load instruction is received.

At decision diamond 412, it is determined whether the current load instruction hits in store buffer 215 with an earlier store. That is, it is determined whether there is a hit (i.e. a match) with a physical store address for a store instruction that is earlier in chronologic order of the instructions stream than the current load instruction. If so, then it indicates that a store instruction that is earlier in the instruction stream for a store address that is the same as the load address of the current instruction has already been sent for execution to LSU0. Therefore, the load data may already be available due to the earlier store instruction. Therefore, if there is a hit, method 400 proceeds from decision diamond 412 to decision diamond 414, where it is determined wither valid store data is stored in the store buffer. If so, method 400 proceeds to block 418 in which the valid store data from store buffer 215 is forwarded to the results bus. That is, the valid store data from store buffer 215 is returned as the result (i.e. the load data) of the current load instruction. However, if, at decision diamond 414, there is no valid store data in store buffer 215, method 400 proceeds to block 416 in which a pending bit for the current load instruction in ld/st execution queues 204a is set to indicate that the current load instruction is pending and waiting for the load data to be returned. Also, the store buffer will clear the pending bit for the load instruction to execute again at a later time. Method 400 then returns to block 402.

Referring back to decision diamond 412, if the current load instruction does not result in a hit in store buffer 215, method 400 proceeds to decision diamond 420 in which it is determined whether a tag hit occurs. That is, the current load instruction is provided to cache 0 (the selected cache for method 400 since the load instruction is received by LSU0). Therefore, after the load address (i.e. the requested address) is provided to DTLB 48 for translation, the appropriate bits of the physical address are compared with TAG array 50 to determined if there is a tag hit. As discussed above, the physical address is compared to portion 38 of TAG array 50 by comparators 66 as well as to portion 39 of TAG array 50 by comparators 67. If no tag hit occurs, i.e. the load address misses in TAG array 50, method 400 proceeds to block 422 in which the physical load address and request is sent to the L2 cache, and then to block 424 in which data from the L2 cache is read and provided to the result bus and refill buffer. Method 400 then returns to block 402.

If, at decision diamond 420, a tag hit does occur, i.e. comparators 67 or 66 determined a match, method 400 proceeds to decision diamond 426 in which it is determined if the tag hit occurred for the same selected cache. In the example of FIG. 4, L1 data cache 0 is the selected cache, and portion 38 of TAG array 50 corresponds to data array 52 of L1 data cache 0. Therefore, if comparators 66 determined a hit, then the tag hit occurred in the same selected cache (in L1 data cache 0 in which the data is in data array 52). In this case, method 400 proceeds to block 428 in which the data is read from the appropriate cache line of the selected cache and provided to the result bus. For example, referring to FIG. 3, the appropriate output of data array 52 is selected by the hit signals provided by comparators 66 to the control input of MUX 70 by way of MUX 64 (in which MUX select 65 is negated), in order to provide the appropriate data from data array 52 to the execution units. However, since portion 39 corresponds to data array 42 of L1 data cache 1, as described above, if comparators 67 determined a hit, then the tag hit occurred in the other cache (L1 data cache 1) and not the same selected cache. In this case, method 400 proceeds from decision diamond 426 to block 430 and to block 436.

In block 430, the physical load address is sent to the other cache. In block 436, the data is read from the other data cache (from data array 42 of L1 data cache 1) and provided to the results bus. For example, referring to FIG. 3, the hit signals output from comparators 67 is provided to latch 30 which stores the hit signals. These hit signals are, in the next or later cycle, provided to the control input of MUX 54 via the second input of MUX 62 (in which MUX select 63 is now asserted), so that the appropriate data can be provided from data array 42 as the output of MUX 54 to the execution units.

After block 430, method 400 proceeds to decision diamond 432 in which it is determined whether the current load instruction hits in load buffer 1 211*b* with a later load. Therefore, since the hit occurred in portion 39 of TAG array 50 which corresponds to the data in data array 42, load buffer 1 211*b* now needs to be checked (where load buffer 0 211*b* was checked back at decision diamond 406). In decision diamond 432, it is determined whether there is a hit (i.e. a match) with a physical load address for a load instruction that is later in chronologic order of the instruction stream than the current load instruction. If so, then it indicates that a load instruction later in the instruction stream for the same load address has already been sent for execution to LSU1. In this case, method 400 proceeds to block 434 in which the pipe is flushed, the later instruction which was in load buffer 1 is ref etched and re-executed. That is, the load data provided in response to the later load instruction may be inaccurate due to the current load instruction. After block 434, or, if it was determined that there was no load buffer 1 hit with a later load at decision diamond 432, method 400 returns to block 402.

After block 436, method 400 also proceeds to decision diamond 438 in which it is determined whether L1 data cache 216 is operating in shared mode or not. In shared mode, a cache line is duplicated in both data arrays 42 and 52. If not in shared mode, then the data in data arrays 42 and 52 may not be the same. If, at decision diamond 438, L1 data cache 216 is in shared cache mode, method 400 proceeds to block 442 in which the physical load address and request is sent to the L2 cache. Method 400 proceeds to block 44 in which the data is read from the L2 cache and provided to the refill buffer to write into the selected cache. Therefore, as seen in FIG. 3, the data from L2 cache can be provided to fill buffer 72 so that it may get written into L1 data cache 0, too. If L1 data cache 216 is not in shared cache mode, method 400 proceeds from decision diamond 438 to block 440 in which the register prediction bits stored in prediction bits storage circuitry 219 are changed so as to point to or indicate the other cache (i.e. the cache which resulted in the hit, which is L1 data cache 1 in this example). Method 400 then returns to block 402.

FIG. 5 illustrates, in flow diagram form, a method 500 of executing a store instruction in single thread mode, in accordance with one embodiment of the present disclosure. Method 500 begins with start 501 and proceeds to block 502 in which a store instruction (with corresponding store data and with a corresponding store address to which the store data is to be stored) is received in by LSU0 210*a* from ld/st arbiter 206*a*. This store instruction may be referred to as the current store instruction. Note that this store instruction has also previously been stored in completion buffer 217. Method 500 continues to block 504 in which address calculation and translation is used to generate the physical address for the store address of the store instruction. That is, based on the store instruction, the store address may be calculated and this store address may subsequently be translated. For example, referring to FIG. 3, the store address from LSU0 (i.e. the request address) is provided to DTLB 48 for translation into a physical address.

Method 500 then proceeds to decision diamonds 506 in which it is determined whether the current store instruction hits in either load buffer 211 (211*a* or 211*b*) with a later load. That is, it is determined whether there is a hit (i.e. a match) with a physical load address for a load instruction that is later in chronologic order of the instruction stream than the current store instruction. If so, then it indicates that a load instruction later in the instruction stream which has a physical load address that is the same as the physical store address for the current store instruction has already been sent for execution to LSU0. In this case, method 500 proceeds to block 508 in which the pipe is flushed, the later instruction which was in load buffer 0 is refetched and re-executed. That is, the load data provided in response to the later load instruction may be inaccurate due to the current store instruction. After block 508, or, if it was determined that there was no load buffer hit with a later load at decision diamond 506, method 500 proceeds to block 510 in which the physical address of the current store instruction is saved into store buffer 215. Method 500 returns to block 502 until another store instruction is received.

FIG. 6 illustrates, in flow diagram form, a method 600 of retiring a store instruction, in accordance with one embodiment. Method 600 begins with start 601 and proceeds to block 602 in which an indication from completion queue 217 is received to retire a store instruction from store buffer 215. That is, once a store instruction completes execution, completion queue 217 is notified as such (such as by ld/st arbiter 206*a* or by LSU 210). Completion queue 217, upon receiving indication that a store instruction is complete, can provide indication of this to store buffer 215. Method 600 then proceeds to block 604 in which the physical store address of the completed store instruction (which may also be referred to as the current store instruction) is sent to the selected cache (which, in the current example, is assumed to be L1 data cache 0 216*a*). Method 600 then proceeds to decision diamond 606 in which it is determined whether a tag hit occurs. That is, the current store instruction is provided to cache 0 (the selected cache for method 600). Therefore, after the store address is provided to DTLB 48 for translation, the appropriate bits of the physical address are compared with TAG array 50 to determined if there is a tag hit. As discussed above, the physical address is compared to portion 38 of TAG array 50 by comparators 66 as well as to portion 39 of TAG array 50 by comparators 67. If no tag hit occurs, i.e. the store address misses in TAG array 50, method 600 proceeds to block 624 in which the physical store address, store data, and request is sent to the L2 cache, and then to block 626 in which data is written into the L2 cache. Method 600 then ends.

If, at decision diamond 606, a tag hit does occur, i.e. comparators 67 or 66 determined a match, method 600 proceeds to decision diamond 608 and to decision diamond 628. At decision diamond 608, it is determined if the tag hit occurred for the same selected cache. In the example of FIG. 6, L1 data cache 0 is the selected cache, and portion 38 of TAG array 50 corresponds to data array 52 of L1 data cache 0. Therefore, if comparators 66 determined a hit, then the tag hit occurred in the same selected cache (in L1 data cache 0 in which the data is in data array 52). In this case, method 600 proceeds to block 610 in which the data is written into the selected cache (L1 data cache 0 216*a*). That is, the store data can be written into the appropriate cache line of the selected cache (into data array 52). However, since portion 39 corresponds to data array 42 of L1 data cache 1, as described above, if comparators 67 determined a hit, then the tag hit occurred in the other cache (L1 data cache 1) and not the same selected cache. In this case, method 600 proceeds from decision diamond 608 to block 612 and to block 614.

In block 614, the physical store address is sent to the other cache. In block 612, the store data is written into the other data cache (into data array 42 of L1 data cache 1). After block 614, method 600 proceeds to decision diamond 620 in which it is determined whether the current store instruction hits in load buffer 1 211*b* with a later load. Therefore, since the hit occurred in portion 39 of TAG array 50 which corresponds to the data in data array 42, load buffer 1 211*b* now needs to be checked (where load buffer 0 211*b* was checked back when the store instruction was received by LSU 0, as described above in decision diamond 506 of FIG. 5). In decision diamond 620, it is determined whether there is a hit (i.e. a match) with a physical address for a load instruction that is later in chronologic order of the instruction stream than the current store instruction. If so, then it indicates that a load instruction later in the instruction stream for a physical load address that is the same as the physical store address of the current store instruction has already been sent for execution to LSU1. In this case, method 600 proceeds to block 622 in which the pipe is flushed, the later instruction which was in load buffer 1 is refetched and re-executed. That is, the load data provided in response to the later load instruction may be inaccurate due to the current completed store instruction. After block 622, or, if it was determined that there was no load buffer 1 hit with a later load at decision diamond 620, method 600 ends.

After block 612, method 600 proceeds to decision diamond 616 as well as to blocks 624 and 626. Blocks 624 and 626 were described above, in which the L2 cache is updated with the current store instruction since L1 data cache 216 operates as a write through cache.

At decision diamond 616, it is determined if L1 data cache 216 is in exclusive mode. If not, method 600 ends. If so, method 600 proceeds to block 618 in which the prediction bits (stored, e.g., in prediction bits storage circuitry 219) for future load instructions to the other cache is modified. In this manner, future load instructions will be directed to L1 data cache 1 216*b*.

Referring back to decision diamond 606, if a tag hit is determined, method 600 also proceeds to decision diamond 628 in which it is determined if the cache line which resulted in the hit is a shared cache line. If not, method 600 ends. If so, method 600 proceeds to block 630 in which either the store data is written to both the selected and other cache (to both L1 data cache 0 216*a* and L1 data cache 1 216*b*) or the store data is written to the selected cache (L1 data cache 0 216*a*) and invalidate the cache line in the other cache (in L1 data cache 1 216*b*). Method 600 then ends.

Therefore, by now it should be appreciated how multiple L1 data caches independently used in separate threads during a multi-thread mode can be reconfigured such that multiple L1 data caches can continue to operate independently during a single thread mode. Also, note that the store buffers used by each pipeline in the execution of a thread in multi-thread mode may be used in a combined fashion for both pipelines in single thread mode. Furthermore, by reconfiguring the TAG arrays for single thread mode to correspond to the data multiple data caches, further efficiency may be achieved.

Note that the functions of the various units and circuitries described above, such as, for example, the decode/issue units 202, the ld/st ex queues 204, ld/st arbiters 206, ld/st ex units 210, and L1 data caches 216 may be performed by various different types of logic or logic instructions. For example, any of the methods (or portions thereof) described above with respect to the flow diagrams of FIGS. 4-6 can be performed by logic or logic instructions located within processor 102.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a data processing system including a processing unit including a first LSU (load/store unit); a second LSU configured to operate independently of the first LSU in single and multi-thread modes; a first store buffer coupled to the first and second LSUs; and a second store buffer coupled to the first and second LSUs, wherein the first store buffer is used to execute a first thread in multi-thread mode, the second store buffer is used to execute a second thread in multi-thread mode, and the first and second store buffers are used when executing a single thread in single thread mode. Item 2 includes the system of item 1 wherein in single-thread mode, the first and second LSUs are configured to execute respective instructions concurrently if the instructions use separate L1 (Level 1) cache units. Item 3 includes the system of item 1 and further includes a first load buffer coupled to the first LSU; a second load buffer coupled to the second LSU; logic instructions executable by the processing unit in single-thread mode to receive a current load instruction; determine a physical address for the current load instruction; determine whether there is a load buffer hit for the physical address for a load instruction that is later in chronological order than the current load instruction; if there is a load buffer hit for the physical address, flush a pipeline of instructions in one of the first and second load buffers corresponding to the load buffer hit; re-fetch the load instruction that is later in the order than the current load instruction; re-execute the load instruction that is later in the order than the current load instruction; and save the physical address of the current load instruction into a corresponding one of the first and second load buffers. Item 4 includes the system of item 1 and further includes logic instructions executable by the processing unit in single-thread mode to receive a current load instruction; determine a physical address for the current load instruction; determine whether there is a store buffer hit for the physical address for a store instruction that is earlier in chronological order than the current load instruction; if there is a store buffer hit for the physical address and data for the physical address is valid, then forward the data from a store buffer corresponding to the store buffer hit to a result bus; and if there is a store buffer hit for the physical address and data for the physical address is not valid, then set a pending indicator for the current load instruction in a corresponding one of the first and second load buffers. Item 5 includes the system of item 1 and further includes a first tag array; a second tag array; logic instructions executable by the processing unit in single thread mode to receive a current load instruction; determine a physical address for the current load instruction; determine whether there is a store buffer hit for the physical address for a load instruction that is earlier in chronological order than the current load instruction; if there is not a store buffer hit for the physical address and there is no tag hit in the first or second tag array for the physical address, then send the physical address and a request associated with the current load instruction to a L2 (level 2) cache unit; and read data from the L2 cache unit. Item 6 includes the system of item 1 wherein the processing unit is further operable to a L1 cache unit; a second L1 cache unit; a first tag array including a first set of tags associated with the first L1 cache unit and a second set of tags associated with the second L1 cache unit; a second tag array including another first set of tags associated with the first L1 cache unit and another second set of tags associated with the second L1 cache unit; logic instructions executable by the processing unit in single thread mode to receive a current load instruction; determine a physical address for the current instruction; determine whether there is a store buffer hit for the physical address for a store instruction that is earlier in a chronological order of instructions than the current load instruction; if there is not a store buffer hit for the physical address, and if there is a tag hit in the first or second tag array for the physical address, and the tag hit is not in a same selected one of the first and second L1 cache units, then send the physical address to the one of the first and second L1 cache units that is not selected; if there is a load buffer hit in one of the first and second LSUs that is not selected for the physical address for the current load instruction that is later in the order than the current load instruction, then flush a pipeline of instructions in one of the first and second load buffers corresponding to the load buffer hit; re-fetch the load instruction that is later in the order than the current load instruction; and re-execute the load instruction that is later in the order than the current load instruction. Item 7 includes the system of item 1 and further includes logic instructions executable by the processing unit in single thread mode to if there is not a store buffer hit for the physical address, if there is a tag hit in the first or second tag array for the physical address, and the tag hit is not in a same selected one of the first and second L1 cache units, then read data from the one of the first and second L1 cache units that is not selected; if the processing unit is operating in shared cache mode, then send the physical address and a request associated with the current load instruction to a L2 cache unit; and read data from the L2 cache unit, otherwise if the processing unit is not operating in shared cache mode, then change a register scoreboard prediction to point to the one of the first and second L1 cache units that is not selected. Item 8 includes the system of item 1 and further includes logic instructions executable by the processing unit in single thread mode to receive a current store instruction; determine a physical address for the store instruction; determine whether there is a load buffer hit for the physical address for a load instruction that is later in a chronological order of instructions than the current store instruction; if there is a load buffer hit for the physical address, then flush a pipeline of instructions in one of the first and second load buffers corresponding to the load buffer hit; re-fetch the load instruction that is later in the order than the current load instruction; and re-execute the load instruction that is later in the order than the current load instruction; and save the physical address to the store buffer. Item 9 includes the system of item 1 and further includes logic instructions executable by the processing unit in single thread mode to receive an indication to retire a store instruction from the first store buffer; send a physical address for the store instruction to a selected cache unit; if there is a tag hit in the first or second tag array for the physical address, the tag hit is not in the selected cache unit, and there is no shared cache line, then write data to the one of the first or second cache units that is not selected; if the processing unit is operating in exclusive cache mode, then modify a prediction indication for a future load instruction to the one of the first or second cache units that is not selected; send the physical address to the one of the first and second cache units that is not selected; if there is a load buffer hit for a physical address of a load instruction received later than the instruction to be retired, flush a pipeline of instructions in the one of the first and second load buffers corresponding to the load buffer hit; re-fetch the load instruction that is later in the order than the current load instruction; and re-execute the load instruction that is later in the order than the current load instruction; if there is a tag hit in the first or second tag array for the physical address, and the tag hit is in the selected cache unit, write the data to the selected L1 cache unit; send the physical address, data, and a request associated with the store instruction to a L2 cache unit; and write the data to the L2 cache unit; if there is a tag hit in the first or second tag array for the physical address, and if there is a shared cache line, write store data to both cache units or write the store data to the selected cache unit and invalidate the other cache unit.

Item 10 includes a method including in a computer processing system operable in single and multi-thread modes, wherein the processing system includes a first load buffer coupled to a first LSU, a second load buffer coupled to a second LSU, and the first and second load buffers are used in single and multi-thread mode: receiving a current load instruction in single thread mode; determining a physical address for the current load instruction; determining whether there is a load buffer hit in one of the first or second load buffers for the physical address for a load instruction that is later in chronological order than the current load instruction; if there is a load buffer hit for the physical address, flushing a pipeline of instructions in one of the first and second load buffers corresponding to the load buffer hit; and re-executing the load instruction that is later in the order than the current load instruction. Item 11 includes the method of item 10 and further includes, in single thread mode, determining whether there is a store buffer hit for the physical address for a load instruction that is earlier in chronological order than the current load instruction; if there is a store buffer hit for the physical address and data for the physical address is valid, then forwarding the data from a store buffer corresponding to the store buffer hit to a result bus; and if there is a store buffer hit for the physical address and data for the physical address is not valid, then setting a pending indicator for the current load instruction in a corresponding one of the first and second load buffers. Item 12 includes the method of item 10 and further includes, in single thread mode, determining whether there is a store buffer hit for the physical address for a load instruction that is earlier in chronological order than the current load instruction; if there is not a store buffer hit for the physical address and there is no tag hit in the first or second tag array for the physical address, then sending the physical address and a request associated with the current load instruction to a L2 cache unit; and reading data from the L2 cache unit. Item 13 includes the method of item 10 and further includes, in single thread mode, if there is not a store buffer hit for the physical address, and if there is a tag hit in the first or second tag array for the physical address, and the tag hit is not in a same selected one of the first and second L1 cache units, then sending the physical address to one of a first and second L1 cache units that is not selected. Item 14 includes the method of item 13 and further includes, in single thread mode, if there is a load buffer hit for the physical address for the current load instruction that is later in the order than the current load instruction, then flush a pipeline of instructions in one of the first and second load buffers corresponding to the load buffer hit; re-fetch the load instruction that is later in the order than the current load instruction; and re-execute the load instruction that is later in the order than the current load instruction. Item 15 includes the method of item 10 and further includes, in single thread mode, determining if there is not a store buffer hit for the physical address, and if there is a tag hit in the first or second tag array for the physical address, and the tag hit is not in a same selected one of first and second L1 cache units, then reading data from the one of the first and second L1 cache units that is not selected; if the processing unit is operating in shared cache mode, then sending the physical address and a request associated with the current load instruction to a L2 cache unit; and reading data from the L2 cache unit, otherwise if the processing unit is not operating in shared cache mode, then changing a register scoreboard prediction to point to the one of the first and second L1 cache units that is not selected. Item 16 includes the method of item 10 and further includes in single thread mode, if there is a load buffer hit for the physical address, then flushing a pipeline of instructions in one of the first and second load buffers corresponding to the load buffer hit; re-fetching the load instruction that is later in the order than the current load instruction; re-executing the load instruction that is later in the order than the current load instruction; and saving the physical address to the store buffer. Item 17 includes the method of item 10 and further includes in single thread mode, receiving an indication to retire a store instruction from a first store buffer; sending a physical address for the store instruction to a first cache unit; if there is a tag hit in the first or second tag array for the physical address, and the tag hit is not in a same selected one of the first and a second cache units, then writing data to the one of the first or second cache units that is not selected; if the processing unit is not operating in exclusive cache mode, then modifying a prediction indication for a future load instruction to the one of the first or second cache units that is not selected; sending the physical address to the one of the first and second cache units that is not selected; if there is a load buffer hit for a physical address of a load instruction received later than the instruction to be retired, then re-executing the load instruction that is later in the order than the current load instruction; if there is a shared cache line, writing store data to the first and second cache units or write the store data to the selected cache unit and invalidate the other cache unit; and otherwise, if there is no tag hit, sending the physical address, data, and a request associated with the current store instruction to a L2 cache unit; and writing the data to the L2 cache unit.

Item 18 includes a data processing system operable in single and multi-thread modes including a processing unit; a first L1 cache unit including a first tag array; a second L1 cache unit including a second tag array; a first load store unit; a second load store unit; a first load buffer and a first store buffer coupled to the first load store unit; a second load buffer and a second store buffer coupled to the second load store unit; logic instructions executable by the processing unit in single thread mode to receive an indication to retire a store instruction from the first store buffer; send a physical address for the store instruction to a selected L1 cache unit; if there is a tag hit in the first or second tag array for the physical address, and the tag hit is not in the selected L1 cache unit, then write data to the one of the first or second cache units that is not selected; if the processing unit is operating in exclusive cache mode, then modify a prediction indication for a future load instruction to the selected L1 cache unit; send the physical address to the one of the first and second L1 cache units that is not selected; if there is a load buffer hit for a physical address of a load instruction received later than the instruction to be retired, then re-execute a load instruction that was received after the instruction to be retired; and if there is a tag hit in the first or second tag array for the physical address, and if there is a shared cache line, perform one of the group consisting of: write store data to the first and second L1 cache units, and write the store data to the selected cache unit and invalidate the other cache unit. Item 19 includes the system of item 18 and further includes logic instructions executable by the processing unit in single thread mode to determine if there is not a store buffer hit for a physical address for an instruction, and if there is a tag hit in the first or second tag array for the physical address, and the tag hit is not in a same selected one of the first and second L1 cache units, then read data from the one of the first and second L1 cache units that is not selected; if the processing unit is operating in shared cache mode, then send the physical address and a request associated with the instruction to a level 2 cache unit; and read data from the level 2 cache unit, otherwise if the processing unit is not operating in shared cache mode, then change a register scoreboard prediction to point to the one of the first and second L1 cache units that is not selected. Item 20 includes the system of item 18 and further includes logic instructions executable by the processing unit in single thread mode to receive a current load instruction; determine a physical address for the current load instruction; determine whether there is a load buffer hit for the physical address for a load instruction that is later in order than the current load instruction; if there is a load buffer hit for the physical address, flush a pipeline of instructions in one of the first and second load buffers corresponding to the load buffer hit; re-fetch the load instruction that is later in the order than the current load instruction; re-execute the load instruction that is later in the order than the current load instruction; and save the physical address of the current load instruction into the a corresponding one of the first and second load buffers.

What is claimed is:

1. A data processing system comprising:
 a processing unit including:
  a first LSU (load/store unit);
  a second LSU configured to operate independently of the first LSU in single and multi-thread modes;
  a first store buffer coupled to the first and second LSUs; and
  a second store buffer coupled to the first and second LSUs, wherein
   the first store buffer is used to execute a first thread in multi-thread mode,
   the second store buffer is used to execute a second thread in multi-thread mode, and
   the first and second store buffers are used when executing a single thread in single thread mode.

2. The system of claim 1 wherein in single-thread mode, the first and second LSUs are configured to:
 execute respective instructions concurrently if the instructions use separate L1 (Level 1) cache units.

3. The system of claim 1 further comprising:
 a first load buffer coupled to the first LSU;
 a second load buffer coupled to the second LSU;
 logic instructions executable by the processing unit in single-thread mode to:
  receive a current load instruction;
  determine a physical address for the current load instruction;
  determine whether there is a load buffer hit for the physical address for a load instruction that is later in chronological order than the current load instruction;
  if there is a load buffer hit for the physical address,
   flush a pipeline of instructions in one of the first and second load buffers corresponding to the load buffer hit;
   re-fetch the load instruction that is later in the order than the current load instruction;
   re-execute the load instruction that is later in the order than the current load instruction; and
   save the physical address of the current load instruction into a corresponding one of the first and second load buffers.

4. The system of claim 1 further comprising:
 logic instructions executable by the processing unit in single-thread mode to:
  receive a current load instruction;
  determine a physical address for the current load instruction;
  determine whether there is a store buffer hit for the physical address for a store instruction that is earlier in chronological order than the current load instruction;
  if there is a store buffer hit for the physical address and data for the physical address is valid, then forward the data from a store buffer corresponding to the store buffer hit to a result bus; and
  if there is a store buffer hit for the physical address and data for the physical address is not valid, then set a pending indicator for the current load instruction in a corresponding one of the first and second load buffers.

5. The system of claim 1 further comprising:
 a first tag array;
 a second tag array;
 logic instructions executable by the processing unit in single thread mode to:
  receive a current load instruction;
  determine a physical address for the current load instruction;
  determine whether there is a store buffer hit for the physical address for a load instruction that is earlier in chronological order than the current load instruction;
  if there is not a store buffer hit for the physical address and there is no tag hit in the first or second tag array for the physical address, then
   send the physical address and a request associated with the current load instruction to a L2 (level 2) cache unit; and
   read data from the L2 cache unit.

6. The system of claim 1 wherein the processing unit is further operable to:
 a L1 cache unit;
 a second L1 cache unit;

a first tag array including a first set of tags associated with the first L1 cache unit and a second set of tags associated with the second L1 cache unit;

a second tag array including another first set of tags associated with the first L1 cache unit and another second set of tags associated with the second L1 cache unit;

logic instructions executable by the processing unit in single thread mode to:

receive a current load instruction;

determine a physical address for the current instruction;

determine whether there is a store buffer hit for the physical address for a store instruction that is earlier in a chronological order of instructions than the current load instruction;

if there is not a store buffer hit for the physical address, and if there is a tag hit in the first or second tag array for the physical address, and the tag hit is not in a same selected one of the first and second L1 cache units, then send the physical address to the one of the first and second L1 cache units that is not selected;

if there is a load buffer hit in one of the first and second LSUs that is not selected for the physical address for the current load instruction that is later in the order than the current load instruction, then flush a pipeline of instructions in one of the first and second load buffers corresponding to the load buffer hit;

re-fetch the load instruction that is later in the order than the current load instruction; and re-execute the load instruction that is later in the order than the current load instruction.

7. The system of claim 1 further comprising:

logic instructions executable by the processing unit in single thread mode to:

if there is not a store buffer hit for the physical address, if there is a tag hit in the first or second tag array for the physical address, and the tag hit is not in a same selected one of the first and second L1 cache units, then read data from the one of the first and second L1 cache units that is not selected;

if the processing unit is operating in shared cache mode, then send the physical address and a request associated with the current load instruction to a L2 cache unit; and read data from the L2 cache unit, otherwise if the processing unit is not operating in shared cache mode, then change a register scoreboard prediction to point to the one of the first and second L1 cache units that is not selected.

8. The system of claim 1 further comprising:

logic instructions executable by the processing unit in single thread mode to:

receive a current store instruction;

determine a physical address for the store instruction;

determine whether there is a load buffer hit for the physical address for a load instruction that is later in a chronological order of instructions than the current store instruction;

if there is a load buffer hit for the physical address, then flush a pipeline of instructions in one of the first and second load buffers corresponding to the load buffer hit;

re-fetch the load instruction that is later in the order than the current load instruction; and re-execute the load instruction that is later in the order than the current load instruction; and save the physical address to the store buffer.

9. The system of claim 1 further comprising:

logic instructions executable by the processing unit in single thread mode to:

receive an indication to retire a store instruction from the first store buffer;

send a physical address for the store instruction to a selected cache unit;

if there is a tag hit in the first or second tag array for the physical address, the tag hit is not in the selected cache unit, and there is no shared cache line, then write data to the one of the first or second cache units that is not selected;

if the processing unit is operating in exclusive cache mode, then modify a prediction indication for a future load instruction to the one of the first or second cache units that is not selected;

send the physical address to the one of the first and second cache units that is not selected;

if there is a load buffer hit for a physical address of a load instruction received later than the instruction to be retired, flush a pipeline of instructions in the one of the first and second load buffers corresponding to the load buffer hit;

re-fetch the load instruction that is later in the order than the current load instruction; and re-execute the load instruction that is later in the order than the current load instruction;

if there is a tag hit in the first or second tag array for the physical address, and the tag hit is in the selected cache unit write the data to the selected L1 cache unit;

send the physical address, data, and a request associated with the store instruction to a L2 cache unit; and write the data to the L2 cache unit;

if there is a tag hit in the first or second tag array for the physical address, and if there is a shared cache line, write store data to both cache units or write the store data to the selected cache unit and invalidate the other cache unit.

10. A method comprising:

in a computer processing system operable in single and multi-thread modes, wherein the processing system includes a first load buffer coupled to a first LSU, a second load buffer coupled to a second LSU, and the first and second load buffers are used in single and multi-thread mode:

receiving a current load instruction in single thread mode;

determining a physical address for the current load instruction;

determining whether there is a load buffer hit in one of the first or second load buffers for the physical address for a load instruction that is later in chronological order than the current load instruction;

if there is a load buffer hit for the physical address, flushing a pipeline of instructions in one of the first and second load buffers corresponding to the load buffer hit; and re-executing the load instruction that is later in the order than the current load instruction.

11. The method of claim 10 further comprising:
in single thread mode:
- determining whether there is a store buffer hit for the physical address for a load instruction that is earlier in chronological order than the current load instruction;
- if there is a store buffer hit for the physical address and data for the physical address is valid, then forwarding the data from a store buffer corresponding to the store buffer hit to a result bus; and
- if there is a store buffer hit for the physical address and data for the physical address is not valid, then setting a pending indicator for the current load instruction in a corresponding one of the first and second load buffers.

12. The method of claim 10 further comprising:
in single thread mode:
- determining whether there is a store buffer hit for the physical address for a load instruction that is earlier in chronological order than the current load instruction;
- if there is not a store buffer hit for the physical address and there is no tag hit in the first or second tag array for the physical address, then
  - sending the physical address and a request associated with the current load instruction to a L2 cache unit; and
  - reading data from the L2 cache unit.

13. The method of claim 10 further comprising:
in single thread mode:
- if there is not a store buffer hit for the physical address, and if there is a tag hit in the first or second tag array for the physical address, and the tag hit is not in a same selected one of the first and second L1 cache units, then
  - sending the physical address to one of a first and second L1 cache units that is not selected.

14. The method of claim 13 further comprising:
in single thread mode:
- if there is a load buffer hit for the physical address for the current load instruction that is later in the order than the current load instruction, then
  - flush a pipeline of instructions in one of the first and second load buffers corresponding to the load buffer hit;
  - re-fetch the load instruction that is later in the order than the current load instruction; and
  - re-execute the load instruction that is later in the order than the current load instruction.

15. The method of claim 10 further comprising:
in single thread mode:
- determining if there is not a store buffer hit for the physical address, and if there is a tag hit in the first or second tag array for the physical address, and the tag hit is not in a same selected one of first and second L1 cache units, then
  - reading data from the one of the first and second L1 cache units that is not selected;
- if the processing unit is operating in shared cache mode, then
  - sending the physical address and a request associated with the current load instruction to a L2 cache unit; and
  - reading data from the L2 cache unit, otherwise
- if the processing unit is not operating in shared cache mode, then changing a register scoreboard prediction to point to the one of the first and second L1 cache units that is not selected.

16. The method of claim 10 further comprising:
in single thread mode:
- if there is a load buffer hit for the physical address, then
  - flushing a pipeline of instructions in one of the first and second load buffers corresponding to the load buffer hit;
  - re-fetching the load instruction that is later in the order than the current load instruction;
  - re-executing the load instruction that is later in the order than the current load instruction; and
  - saving the physical address to the store buffer.

17. The method of claim 10 further comprising:
in single thread mode:
- receiving an indication to retire a store instruction from a first store buffer;
- sending a physical address for the store instruction to a first cache unit;
- if there is a tag hit in the first or second tag array for the physical address, and the tag hit is not in a same selected one of the first and a second cache units, then
  - writing data to the one of the first or second cache units that is not selected;
  - if the processing unit is not operating in exclusive cache mode, then modifying a prediction indication for a future load instruction to the one of the first or second cache units that is not selected;
  - sending the physical address to the one of the first and second cache units that is not selected;
  - if there is a load buffer hit for a physical address of a load instruction received later than the instruction to be retired, then re-executing the load instruction that is later in the order than the current load instruction;
  - if there is a shared cache line, writing store data to the first and second cache units or write the store data to the selected cache unit and invalidate the other cache unit; and
- otherwise, if there is no tag hit, sending the physical address, data, and a request associated with the current store instruction to a L2 cache unit; and writing the data to the L2 cache unit.

18. A data processing system operable in single and multi-thread modes comprising:
- a processing unit;
- a first L1 cache unit including a first tag array;
- a second L1 cache unit including a second tag array;
- a first load store unit;
- a second load store unit;
- a first load buffer and a first store buffer coupled to the first load store unit;
- a second load buffer and a second store buffer coupled to the second load store unit;
- logic instructions executable by the processing unit in single thread mode to:
  - receive an indication to retire a store instruction from the first store buffer;
  - send a physical address for the store instruction to a selected L1 cache unit;
  - if there is a tag hit in the first or second tag array for the physical address, and the tag hit is not in the selected L1 cache unit, then
    - write data to the one of the first or second cache units that is not selected;
    - if the processing unit is operating in exclusive cache mode, then modify a prediction indication for a future load instruction to the selected L1 cache unit;

send the physical address to the one of the first and second L1 cache units that is not selected;

if there is a load buffer hit for a physical address of a load instruction received later than the instruction to be retired, then re-execute a load instruction that was received after the instruction to be retired; and if there is a tag hit in the first or second tag array for the physical address, and if there is a shared cache line, perform one of the group consisting of: write store data to the first and second L1 cache units, and write the store data to the selected cache unit and invalidate the other cache unit.

19. The system of claim 18 further comprising:

logic instructions executable by the processing unit in single thread mode to:

determine if there is not a store buffer hit for a physical address for an instruction, and if there is a tag hit in the first or second tag array for the physical address, and the tag hit is not in a same selected one of the first and second L1 cache units, then read data from the one of the first and second L1 cache units that is not selected;

if the processing unit is operating in shared cache mode, then send the physical address and a request associated with the instruction to a level 2 cache unit; and read data from the level 2 cache unit, otherwise if the processing unit is not operating in shared cache mode, then change a register scoreboard prediction to point to the one of the first and second L1 cache units that is not selected.

20. The system of claim 18 further comprising:

logic instructions executable by the processing unit in single thread mode to:

receive a current load instruction;

determine a physical address for the current load instruction;

determine whether there is a load buffer hit for the physical address for a load instruction that is later in order than the current load instruction;

if there is a load buffer hit for the physical address, flush a pipeline of instructions in one of the first and second load buffers corresponding to the load buffer hit;

re-fetch the load instruction that is later in the order than the current load instruction;

re-execute the load instruction that is later in the order than the current load instruction; and save the physical address of the current load instruction into the a corresponding one of the first and second load buffers.

* * * * *